United States Patent
Mizuno et al.

(10) Patent No.: US 6,782,898 B2
(45) Date of Patent: Aug. 31, 2004

(54) RING-SHAPED PART WASHING METHOD AND WASHING JIG USED IN THE METHOD

(75) Inventors: Hiroki Mizuno, Kanagawa (JP); Shigeo Tokura, Kanagawa (JP); Masaji Kashimoto, Fukushima (JP); Takayuki Kurashima, Fukushima (JP)

(73) Assignee: NSK LTD, Tokyo (JP)

( * ) Notice: Subject to any disclaimer, the term of this patent is extended or adjusted under 35 U.S.C. 154(b) by 79 days.

(21) Appl. No.: 09/929,368

(22) Filed: Aug. 15, 2001

(65) Prior Publication Data

US 2002/0023660 A1 Feb. 28, 2002

(30) Foreign Application Priority Data

Aug. 15, 2000 (JP) .................................... P.2000-246360

(51) Int. Cl.⁷ ................................................. B08B 9/20
(52) U.S. Cl. .................... 134/25.4; 134/1; 134/22.1; 134/23; 134/25.1; 134/25.5; 134/40
(58) Field of Search ............................. 134/1, 22.1, 23, 134/25.1, 25.4, 25.5, 40, 2, 34, 184; 366/113, 114, 127

(56) References Cited

U.S. PATENT DOCUMENTS

| | | | | |
|---|---|---|---|---|
| 3,557,807 A | * | 1/1971 | Schipke | 134/1 |
| 4,057,070 A | * | 11/1977 | van Amerongen et al. | 134/83 |
| 5,813,074 A | * | 9/1998 | Liljeholm | 15/21.1 |
| 6,694,991 B1 | * | 2/2004 | Mizuno et al. | 134/147 |

FOREIGN PATENT DOCUMENTS

| | | | |
|---|---|---|---|
| DE | 3626054 | * | 6/1987 |
| JP | 55-88890 | | 12/1953 |
| JP | 56-172388 | | 5/1955 |
| JP | 35327272 | * | 3/1978 |
| JP | 58-100085 | | 7/1983 |
| JP | 59-24185 | | 2/1984 |
| JP | 63 90484 | | 6/1988 |
| JP | 4-26080 | | 3/1992 |
| JP | 6-91239 | | 4/1994 |
| JP | 6-221331 | | 8/1994 |
| JP | 6-285435 B1 | | 10/1994 |
| JP | 7-108230 | | 4/1995 |
| JP | 7-185479 | | 7/1995 |
| JP | 2001-129497 B1 | | 5/2001 |

OTHER PUBLICATIONS

Merriam–Webster's Collegiate Dictionary. Tenth edition. 1999, pp. 81 and 82.*

* cited by examiner

Primary Examiner—M. Kornakov
(74) Attorney, Agent, or Firm—Sughrue Mion, PLLC

(57) ABSTRACT

In a ring shaped part washing method an ultrasonic vibration plate 33 is disposed in a washing tank 23 filled with a washing fluid 31, and ultrasonic waves generated by the ultrasonic vibration plate 33 are applied to ring-shaped parts 27 disposed in the washing tank 23 to thereby remove foreign substances stick to the ring-shaped parts 27 therefrom. The ring-shaped parts 27 are disposed inclinedly with respect to the ultrasonic vibration plate 33 in such a manner that the axes 27a of the ring-shaped parts 27 intersect with the plate surface 33a of the ultrasonic vibration plate 33 at an angle θ other than a right angle.

7 Claims, 7 Drawing Sheets

RING-SHAPED PART WASHING METHOD AND WASHING JIG USED IN THE METHOD

BACKGROUND OF THE INVENTION

1. Field of the Invention

The present invention relates to a ring-shaped part washing method for removing foreign substances adhering to an inner race or an outer race of a rolling bearing therefrom using ultrasonic waves and a washing jig used in the ring-shaped part washing method.

2. Description of the Related Art

An inner race or outer race (the inner race or outer race is hereinafter referred to as a ring-shaped part) of a rolling bearing, due to the role thereof, requires high cleanliness and, therefore, the ring-shaped part is washed before it is assembled as a rolling bearing. Conventionally, for such washing, there is employed a washing method using ultrasonic waves. In the washing method, for example, as shown in FIG. 14, an ultrasonic vibration plate 5 is disposed on the bottom surface of a washing tank 3 which is filled with a washing fluid 1, ring-shaped parts 9 stored in a basket 7 are immersed into the washing tank 3 together with the basket 7, and ultrasonic waves generated from the ultrasonic vibration plate 5 are applied to the ring-shaped parts 9 to thereby remove foreign substances adhering to the surfaces of the ring-shaped parts 9 therefrom.

On the other hand, in the case of a washing method which does not use the basket 7, as shown in FIG. 15, a skewer-shaped member 11 is inserted through the inner peripheries of a plurality of ring-shaped parts 9, the ring-shaped parts 9 are immersed into the washing tank 3 together with the skewer-shaped member 11, and ultrasonic waves generated from the ultrasonic vibration plate 5 are applied to the ring-shaped parts 9 to thereby remove foreign substances adhering to the surfaces of the ring-shaped parts 9 therefrom. According to this washing method, the outer peripheral surfaces of the ring-shaped parts 9 can be prevented from damage and a large number of ring-shaped parts 9 can be washed at the same time.

However, neither the conventional washing method using a basket nor the conventional washing method using a skewer-shaped member takes into sufficient consideration that the ultrasonic waves propagate straight, which makes it difficult to obtain a satisfactory washing effect. That is, in the washing method using a basket shown in FIG. 14, the ultrasonic waves are applied to the end faces 9a of the ring-shaped parts 9 at right angles to thereby obtain a washing effect, whereas the ultrasonic waves propagate straight in parallel to the outer peripheral surfaces 9b and inner peripheral surfaces 9c of the ring-shaped parts 9, which makes it hard to provide a satisfactory washing effect. On the other hand, in the washing method using a skewer-shaped member shown in FIG. 15, the ultrasonic waves are applied to the outer peripheral surfaces 9b of the ring-shaped parts 9 to thereby obtain a washing effect, whereas the ultrasonic waves propagate straight in parallel to the end faces of the ring-shaped parts 9 and the ultrasonic waves cannot be propagated to the inner peripheral surfaces 9c of the ring-shaped parts 9 thereby having dead grounds, which are areas where ultrasonic waves cannot be applied, on the inner peripheral surfaces 9c, so that a satisfactory washing effect cannot be obtained.

SUMMARY OF THE INVENTION

The present invention aims at eliminating the drawbacks found in the above-mentioned conventional washing methods. Accordingly, it is an object of the invention to provide a ring-shaped part washing method capable of applying ultrasonic waves to all of the outer peripheral surfaces, inner peripheral surfaces and end faces of ring-shaped parts at the same time, and a washing jig used in the washing method, thereby being able to enhance a washing effect on the ring-shaped parts.

In attaining the above object, according to a first aspect of the invention, there is provided a ring-shaped part washing method in which an ultrasonic vibration plate is disposed in a washing tank filled with a washing fluid, and ultrasonic waves generated by the ultrasonic vibration plate are applied to ring-shaped parts disposed within the washing tank to thereby remove foreign substances adhering to the ring-shaped parts therefrom. The ring-shaped parts are disposed inclinedly with respect to the ultrasonic vibration plate in such a manner that the axes of the ring-shaped parts intersect with the plate surface of the ultrasonic vibration plate at other angles than a right angle.

According to the present ring-shaped washing method, since the ring-shaped parts are disposed inclinedly with respect to the ultrasonic vibration plate in such a manner that the axes of the ring-shaped parts intersect with the plate surface of the ultrasonic vibration plate at other angles than a right angle, the inner peripheral surfaces and outer peripheral surfaces of the ring-shaped parts extending in parallel to the axes of the ring-shaped parts as well as the two end faces of the ring-shaped parts intersecting with the axes of the ring-shaped parts at right angles can be all disposed at given inclination angles with respect to the ultrasonic waves to be applied from the ultrasonic vibration plate. Also, the ultrasonic waves generated from the ultrasonic vibration plate or reflected from the liquid surface can be positively applied onto the inner peripheral surfaces of the ring-shaped parts thereby not having the dead grounds, which are areas where ultrasonic waves cannot be propagated, on the inner peripheral surfaces of the ring-shaped parts. Thanks to this, the ultrasonic waves can be applied equally onto all of the outer surfaces of the ring-shaped parts, which makes it possible to obtain a high washing effect.

And, in the case of the present ring-shaped washing method, the above-mentioned angle can be set in the range of 30°–60°.

According to the present ring-shaped washing method, when the ring-shaped parts are inclined disposed in such a manner that the axes thereof intersect with the plate surface of the ultrasonic vibration plate at an angle of 45°, the average handling quantity can be secured not only without having the above-mentioned dead grounds on the inner peripheral surfaces of the ring-shaped parts, but also without increasing the distance between the ring-shaped parts. Also, in the case of ring-shaped parts each having a narrow width in the axial direction thereof, when the ring-shaped parts are inclined disposed in such a manner that the axes thereof intersect with the plate surface of the ultrasonic vibration plate at an angle of 30°, not only propagation of the ultrasonic waves at the inner peripheral surfaces of the ring-shaped parts can be secured but also the washing quantity can be increased. Further, when the ring-shaped parts are inclined disposed in such a manner that the axes thereof intersect with the plate surface of the ultrasonic vibration plate at an angle of 60°, even in the case of ring-shaped parts each having a wide width in the axial direction thereof as well, propagation of the ultrasonic waves to the inner peripheral surfaces of the ring-shaped parts can be secured positively.

And, the ring-shaped part washing method may also be performed that a linear-shaped support member having a plurality of notches respectively for supporting the ring-shaped parts in an inclined manner is inserted into the inner peripheral sides of the ring-shaped parts with the notches facing downward and thus the ring-shaped parts are supported on the support member in such a manner that the ring-shaped parts hang down from the support member; and, after then, the support member is rotated by 180° to turn the notches onto the upper portion side of the support member and thus the upper portions of the inner peripheries of the ring-shaped parts are put in to the notches, whereby all of the ring-shaped parts are inclined supported on the support member at the same time.

According to this ring-shaped parts washing method, the support member is inserted into the inner peripheral portions of the plurality of ring-shaped parts to thereby support the ring-shaped parts on the support member in a hang-down manner once. After then, in case where the support member is rotated by 180°, the upper portions of the inner peripheries of the ring-shaped parts are put into the notches, so that all of the ring-shaped parts are inclined supported on the support member at the same time. This eliminates the need to place the ring-shaped parts one by one around the support member for inclined support thereof.

According to a second aspect of the invention, for use in a ring-shaped part washing method according to the first aspect of the invention, there is provided a washing jig which inclinedly supports the ring-shaped parts in a washing tank filled with a washing fluid and including an ultrasonic vibration plate in such a manner that the axes of the ring-shaped parts intersect with the plate surface of the ultrasonic vibration plate at other angles than a right angle, wherein, in the upper edges of a pair of parallel long plates with the two ends of which are supported on the washing tank in such a manner that the longitudinal direction thereof provides the horizontal direction and the plates surfaces of which provide vertical surfaces, there are formed a plurality of notches, into which the lower portions of the ring-shaped parts can be put down for supporting the same in an inclined manner, at given intervals in the longitudinal direction of the respective long plates.

According to the present washing jig, the lower portions of the outer peripheries of the ring-shaped parts are put into the notches formed in the upper edges of the pair of parallel long plates and, with the positions thereof restricted by the notches, the ring-shaped parts can be disposed inclined with respect to the ultrasonic vibration plate. Since the long plates are not inserted into the inner peripheral sides of the ring-shaped parts, the ring-shaped parts can be taken out at a time without pulling them out of the two long plates.

And, the present washing jig may also be structured that, in the upper portions of the outer periphery of a round rod the two ends of which are supported on the washing tank such that the longitudinal direction thereof provides the horizontal direction and also which has a circular-shaped section, there are formed a plurality of notches, into which the upper portions of the inner peripheries of the ring-shaped parts can be put in to thereby support the ring-shaped parts in an inclined manner, at given intervals in the longitudinal direction of the round rod.

According to this washing jig, the round rod is inserted through the inner peripheries of the ring-shaped parts, the upper portions of the inner peripheries of the ring-shaped parts are put into the notches formed in the upper portion of the outer periphery of the round rod, and the ring-shaped parts can be disposed inclinedly with respect to the ultrasonic vibration plate while the positions thereof are restricted by the notches. Also, according to the present jig, after the round rod is inserted through the inner peripheral sides of the plurality of ring-shaped parts, by rotating the round rod by 180°, the upper portions of the inner peripheries of the ring-shaped parts can be respectively put into their associated notches and thus all of the ring-shaped parts can be inclined supported on the round rod at the same time.

Also, the washing jig may also be structured such that, in the upper edges of a long plate the two ends of which are supported on the washing tank in such a manner that the longitudinal direction thereof provides the horizontal direction and the plate surface of which provides a vertical surface, there are formed a plurality of notches into which the upper portions of the inner peripheries of the ring-shaped parts can be put in to thereby support the ring-shaped parts in a inclined manner, while the notches are arranged at given intervals in the longitudinal direction of the long plate.

According to this washing jig, the long plate is inserted through the inner peripheries of the ring-shaped parts and the upper portions of the inner peripheries of the ring-shaped parts are put into the notches formed in the upper edge of the long plate, so that the ring-shaped parts can be disposed inclinedly with respect to the ultrasonic vibration plate while they are restricted in position by the notches. Also, according to this jig, after the long plate is inserted through the inner peripheral sides of the ring-shaped parts, by rotating the long plate by 180°, the upper portions of the inner peripheries of the ring-shaped parts can be put into the notches and thus all of the ring-shaped parts can be inclined supported on the long plate at the same time. Further, since the long plate is disposed in such a manner that the plate surface thereof provides a vertical surface, when compared with the previously-described round rod, the propagation of the ultrasonic waves cannot be interfered and thus the dead grounds are reduced on the inner peripheries of the ring-shaped parts.

Further, the present washing jig may also be structured such that, in the notches, into which the upper portions of the inner peripheries of the ring-shaped parts can be put in to thereby support the ring-shaped parts in a inclined manner, there are disposed stoppers which can be contacted respectively with the upper portions of the outer peripheries of the ring-shaped parts to thereby stabilize the inclined support of the ring-shaped parts.

According to this washing jig, in case where the upper portions of the inner peripheries of the ring-shaped parts are put into the notches formed in the round rod or long plate, the ring-shaped parts are supported in a inclined manner and also the stoppers are contacted with the upper portions of the outer peripheries of the thus inclined supported ring-shaped parts. Due to this, the ring-shaped parts can be prevented from moving out of their inclinedly supported states, which makes it possible to stabilize the inclined support of the ring-shaped parts.

Also, according to another aspect of the invention, there is provided a washing jig which supports ring-shaped parts in a washing tank, which is filled with a washing fluid and incorporates therein an ultrasonic vibration plate, in such an inclined manner that the axes of the ring-shaped parts intersect with the plate surface of the ultrasonic vibration plate at other angles than a right angle, wherein there is formed a basket made of mesh or punching material for storing the ring-shaped parts therein and, in the bottom portion of the basket, there are formed a plurality of saw-blade-shaped recessed portions into which the lower portions of the ring-shaped parts can be put in to thereby be able to support the ring-shaped parts in their inclined states.

According to this washing jig, the lower portions of the ring-shaped parts put into the basket are put into the saw-blade-shaped recessed portions formed in the bottom portion of the basket, and the ring-shaped parts are disposed inclinedly with respect to the ultrasonic vibration plate while they are restricted in position by the recessed portions. Since the round rod or long plate is not inserted through the inner peripheral sides of the ring-shaped parts, there are eliminated the operation to insert the round rod or long plate into the ring-shaped parts as well as the operation to take out the round rod or long plate from the ring-shaped parts, so that a plurality of ring-shaped parts can be stored or taken out at a time. Also, since the basket is made of mesh or punching material, there is less possibility that the basket can interfere with the propagation of the ultrasonic waves and thus the dead angles can be reduced in the washing surfaces of the ring-shaped parts.

DETAILED DESCRIPTION OF THE PREFERRED EMBODIMENTS

Now, description will be given below in detail of the preferred embodiments of a ring-shaped part washing method and a washing jig used in the washing method according to the invention with reference to the accompanying drawings.

Figure 1:
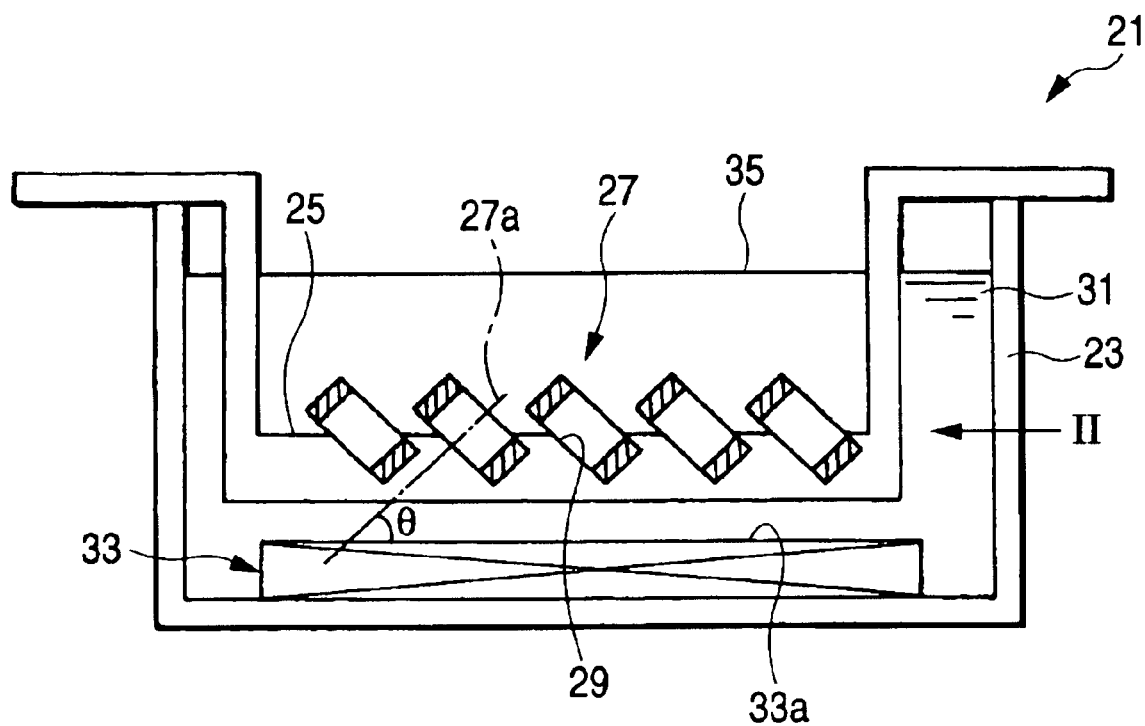
FIG. 1 is a longitudinal section view of a washing tank, explaining a ring-shaped part washing method and a washing jig used in the washing method according to a first embodiment of the invention.
Figure 2:
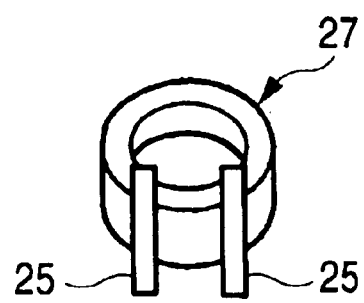
FIG. 2 is a schematic view of FIG. 1, when it is viewed from the direction of the arrow mark II shown in FIG. 1.

FIG. 1 is a longitudinal section view of a washing tank, explaining a ring-shaped part washing method and a washing jig used in the washing method according to a first embodiment of the invention. FIG. 2 is a schematic view of FIG. 1, when it is viewed from the direction of the arrow mark II shown in FIG. 1.

A washing jig 21, which is used in a washing method according to the first embodiment, includes, as a main part of its structure, a pair of parallel long plates 25, 25 the two ends of which are supported on a washing tank 23 in such a manner that the longitudinal direction of the long plates 25, 25 provides the horizontal direction. The long plates 25, 25 are disposed in such a manner that the plate surfaces thereof respectively provide vertical surfaces and, in the respective upper edges of the long plates 25, 25, there are formed a plurality of notches 29 at given intervals in the longitudinal direction of the long plates 25, 25, so as to put the lower portions of ring-shaped parts 27. In the present embodiment, in each of the two long plates 25, 25, there are formed five pairs of notches 29.

In case where the lower portions of the outer peripheries of the ring-shaped parts 27 are respectively put into their associated notches 29, the notches 29 place the ring-shaped parts 27 thereon in such a manner that the ring-shaped parts 27 are inclined. That is, the long plates 25, 25 support the ring-shaped parts 27 inclinedly in the washing tank 23, which is filled with a washing fluid 31 and includes an ultrasonic vibration plate 33 disposed on the bottom portion thereof, in such a manner that the axes 27a of the ring-shaped parts 27 respectively intersect with the plate surface 33a of the ultrasonic vibration plate 33 at an angle θ other than a right angle.

The two long plates 25, 25 are structured such that the two end portions thereof are respectively formed in an inverted-L shape, while the inverted-L-shaped two end portions can be hung on the mutually opposing walls of the washing tank 23. That is, in the case of the long plates 25, 25, the ring-shaped parts 27 are set on the long plates 25, 25 outside of the washing tank 23 and thus, in a state where the ring-shaped parts 27 are inclinedly placed on the long plates 25, 25, the inverted-L-shaped two end portions of the long plates 25, 25 are hung onto the walls of the washing tank 23. Thanks to this, the ring-shaped parts 27 can be supported in an inclined manner within the washing tank 23.

In a washing method for washing the ring-shaped parts 27 according to the present embodiment, using the washing jig 21, the ring-shaped parts 27 are disposed inclinedly with respect to the ultrasonic vibration plate 33 in such a manner that the axes 27a of the ring-shaped parts 27 respectively intersect with the plate surface 33a of the ultrasonic vibration plate 33 at an angle θ other than a right angle. Further, ultrasonic waves generated by the ultrasonic vibration plate 33 are applied to the thus inclinedly supported ring-shaped parts 27 to thereby be able to remove foreign substances stuck to the ring-shaped parts 27.

According to the present washing method for washing the ring-shaped parts 27, by arranging the ring-shaped parts 27 in an inclined manner, the inner peripheral surfaces and outer peripheral surfaces of the ring-shaped parts 27 extending in parallel to the axes 27a as well as the two end faces of the ring-shaped parts 27 intersecting with the axes 27a at right angles are all disposed at their given inclined angles with respect to the ultrasonic waves given from the ultrasonic vibration plate 33. And, since the ultrasonic waves given directly from the ultrasonic vibration plate 33 or the ultrasonic waves reflected from a liquid surface 35 are applied to the inner peripheral surfaces of the ring-shaped parts 27, there is less possibility that the ultrasonic waves cannot be propagated to the inner peripheral surfaces, and thus the above-mentioned dead grounds can be removed. Due to this, the ultrasonic waves can be applied equally to all of the external surfaces of the ring-shaped parts 27, which make it possible to provide a high washing effect.

Also, according to the above-mentioned washing jig 21, the lower portions of the outer peripheral surfaces of the ring-shaped parts 27 can be put into the notches 29 formed in the upper edges of the pair of parallel long plates 25, 25 and, with the positions of the ring-shaped parts 27 restricted by the notches 29, the ring-shaped parts 27 can be disposed inclinedly with respect to the ultrasonic vibration plate 33. And, in the case of the ring-shaped parts 27, the long plates 25, 25 are not inserted into the inner peripheries of the ring-shaped parts 27 but the lower portions of the ring-shaped parts 27 are simply placed on the long plates 25, 25; and, therefore, without taking out the long plates 25, 25 from the inner peripheral sides of the ring-shaped parts 27, the ring-shaped parts 27 can be removed from the washing jig 21 at a time.

Next, description will be given below of a second embodiment of a washing method and a washing jig used in the washing method according to the invention.

Figure 3:
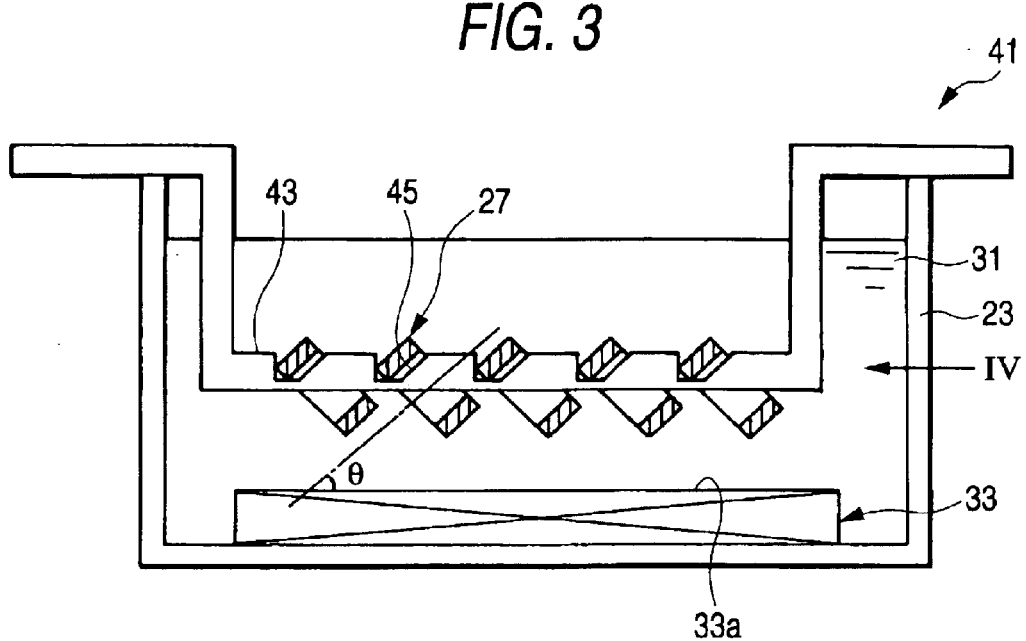
FIG. 3 is a longitudinal section view of a washing tank, explaining a ring-shaped part washing method and a washing jig used in the washing method according to a second embodiment of the invention.
Figure 4:
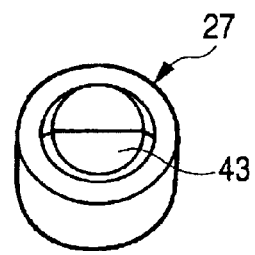
FIG. 4 is a schematic view of FIG. 3, when it is viewed from the direction of the arrow mark IV shown in FIG. 3.
Figure 5:
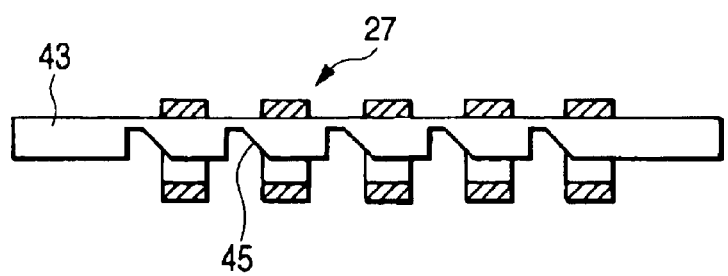
FIG. 5 is an explanatory view of the state of ring-shaped parts just before they are set.

FIG. 3 is a longitudinal section view of a washing tank, explaining a ring-shaped part washing method and a washing jig used in the washing method according to a second embodiment of the invention. FIG. 4 is a schematic view of FIG. 3, when it is viewed from the direction of the arrow mark IV shown in FIG. 3. FIG. 5 is an explanatory view of the state of ring-shaped parts just before they are set.

A washing jig 41, which is used in a washing method according to the second embodiment, includes, as a main portion of its structure, a round rod 43 which has a circular section and the two ends of which are to be supported in a washing tank 23 in such a manner that the longitudinal direction of the round rod 43 provides the horizontal direction. In the upper portion of the outer peripheral portion of the round rod 43, there are formed a plurality of notches 45 at given intervals in the longitudinal direction of the round rod 43, into which the upper portions of the inner peripheral portions of ring-shaped parts 27 can be put in. Specifically, in the present embodiment, there are formed five notches 45.

With use of the notches 45, in case where the upper portions of the inner peripheries of ring-shaped parts 27 are respectively put into their associated notches 45, the ring-shaped parts 27 can be placed there in an inclined state. That is, the round rod 43 supports the ring-shaped parts 27 inclinedly in the washing tank 23, which is filled with a washing fluid 31 and includes an ultrasonic vibration plate 33 disposed on the bottom portion thereof, in such a manner that the axes 27a of the ring-shaped parts 27 respectively intersect with the plate surface 33a of the ultrasonic vibration plate 33 at an angle θ other than a right angle.

In the case of the washing jig 41 according to the present embodiment as well, the two end portions of the washing jig 41 are respectively formed in an inverted-L shape and the inverted-L-shaped two end portions are respectively secured on the mutually opposing walls of the washing tanks 23. According to the present washing jig 41, the round rod 43, which is a linear support member with the plurality of notches 45 formed therein, as shown in FIG. 5, is inserted into the inner peripheral sides of the plurality of ring-shaped parts 27 in such a manner that the notches 45 are disposed on the lower side of the round rod 43. Then, after the ring-shaped parts 27 are supported on the round rod 43 in such a manner that they hang down from the round rod 43, the round rod 43 is rotated by 180° to thereby dispose the notches 45 on the upper side of the round rod 43, whereby the upper portions of the inner peripheries of the ring-shaped parts 27 can be put into the notches 45, as shown in FIG. 3. Thus, all of the ring-shaped parts 27 can be inclinedly supported on the round rod 43 at the same time.

In the case of the present round rod 43, the plurality of ring-shaped parts 27 are set in this manner outside of the washing tank 23 and, the two end portions of the round rod 43 are secured to the walls of the washing tank 23 in a state where the ring-shaped parts 27 are inclined supported on the round rod 43, whereby the ring-shaped parts 27 can be supported within the washing tank 23 in such a manner that they hang down from the round rod 43 in an inclined manner.

In the washing method for washing the ring-shaped parts 27 according to the present embodiment, similarly to the previously described washing method according to the first embodiment, since the ring-shaped parts 27 are arranged in an inclined manner, the inner peripheral surfaces, outer peripheral surfaces and two end faces of the ring-shaped parts 27 can be all disposed at given inclined angles with respect to the ultrasonic waves. Further, there is less possibility that the ultrasonic waves cannot be propagated to the inner peripheral surfaces of the ring-shaped parts 27 and the above-mentioned dead grounds on the inner peripheral surfaces can be reduced. Thanks to this, the ultrasonic waves can be applied equally to all of the outer surfaces of the ring-shaped parts 27, thereby being able to provide a high washing effect.

And, in case where the round rod 43 is inserted into the inner peripheral sides of the plurality of ring-shaped parts 27, the ring-shaped parts 27 are once supported on the round rod 43 in a hang-down manner. After then, when the round rod 43 is rotated by 180°, the upper portions of the inner peripheries of the ring-shaped parts 27 can be put into the notches 45, so that all of the ring-shaped parts 27 can be inclinedly supported on the round rod 43 at the same time. Thus, there is no need to put the ring-shaped parts 27 around the round rod 43 one by one for their inclined support. This can facilitate the automated setting of the ring-shaped parts 27.

Also, according to the present washing jig 41, when the round rod 43 inserted into the inner peripheral sides of the plurality of ring-shaped parts 27 is rotated by 180°, the upper portions of the inner peripheries of the ring-shaped parts 27 can be put into the notches 45, so that all of the ring-shaped parts 27 can be inclinedly supported on the round rod 43 at the same time.

Next, description will be given below of a washing jig according to a third embodiment of the invention.

Figure 6:
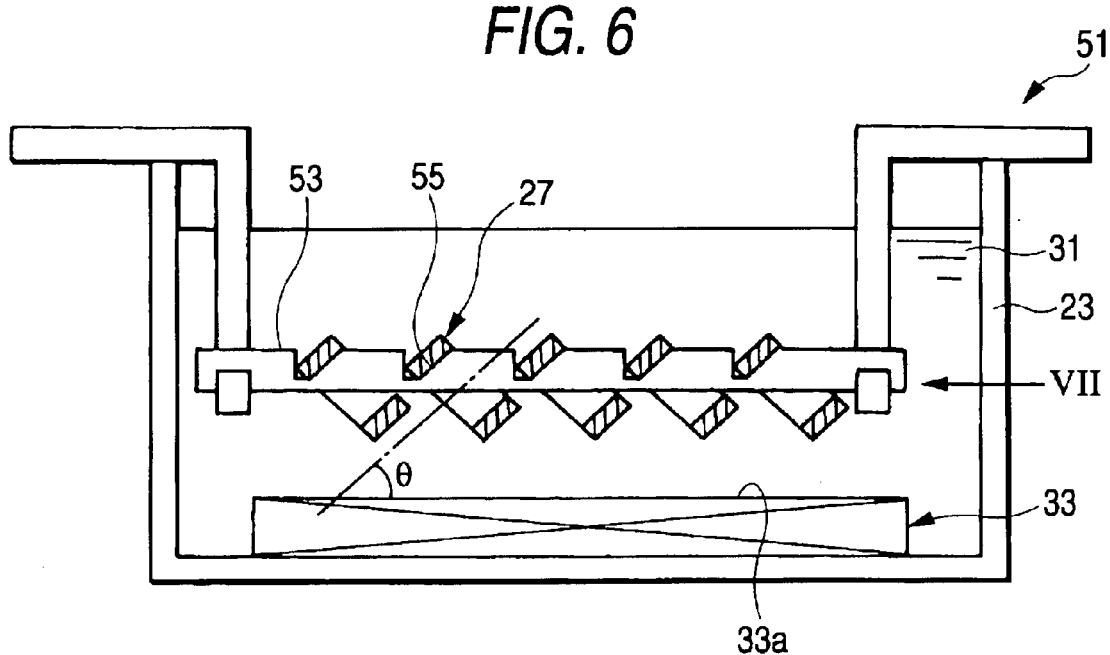
FIG. 6 is a longitudinal section view of a washing tank, explaining a washing jig according to a third embodiment of the invention.
Figure 7:
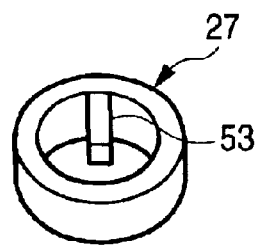
FIG. 7 is a schematic view of FIG. 6, when it is viewed from the direction of the arrow mark VII shown in FIG. 6.
Figure 8:
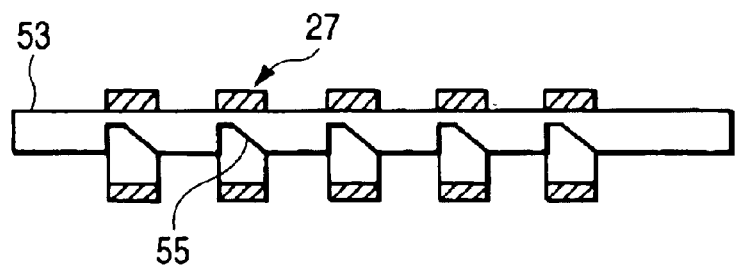
FIG. 8 is an explanatory view of the state of ring-shaped parts just before they are set.

FIG. 6 is a longitudinal section view of a washing tank, explaining a washing jig according to a third embodiment of the invention. FIG. 7 is a schematic view of FIG. 6, when it is viewed from the direction of the arrow mark VII shown in FIG. 6. FIG. 8 is an explanatory view of the state of ring-shaped parts just before they are set.

A washing jig 51 according to the third embodiment of the invention includes, as a main part of its structure, a long plate 53 the two ends of which are to be supported on a washing tank 23 in such a manner that the longitudinal direction of the long plate 53 provides the horizontal direction. The long plate 53 is disposed in such a manner that the plate surface thereof provides a vertical surface and, in the upper edge of the long plate 53, there are formed a plurality of notches 55 at given intervals in the longitudinal direction of the long plate 53, into which the upper portions of the inner peripheries of the ring-shaped parts 27 can be respectively put in. In the present embodiment, in the long plate 53, there are formed five notches 55. That is, according to the washing jig 51, the round rod 43 of the washing jig 41 according to the second embodiment is replaced with the long plate 53.

In the washing jig 51, the long plate 53 is inserted into the respective inner peripheries of the ring-shaped parts 27, the upper portions of the inner peripheries of the ring-shaped parts 27 are put into the notches 55 formed in the upper edge of the long plate 53, and the ring-shaped parts 27 can be disposed inclinedly with respect to the ultrasonic vibration plate 33 while the positions of the ring-shaped parts 27 are restricted by the notches 55. Also, according to the washing jig 51, as shown in FIG. 8, after the long plate 53 is inserted into the respective inner peripheral sides of the plurality of ring-shaped parts 27, by rotating the long plate 53 by 180°, the upper portions of the inner peripheries of the ring-shaped parts 27 can be put into the notches 55, whereby all of the ring-shaped parts 27 can be inclined supported on the long plate 53 at the same time. Further, since the long plate 53 is disposed in such a manner that the plate surface of the long plate 53, as shown in FIG. 7, provides a vertical surface, when compared with the structure using the round rod 43 shown in FIG. 4, there can be reduced the possibility that the propagation of the ultrasonic waves can be interfered as well as the possibility that the ultrasonic waves cannot be propagated the inner peripheral surfaces of the ring-shaped parts 27. Further, the dead grounds on such inner peripheral surfaces can be reduced. Therefore, according to the third embodiment, there can be obtained a further higher washing effect.

Next, description will be given below of a washing jig according to a fourth embodiment of the invention.

Figure 9:
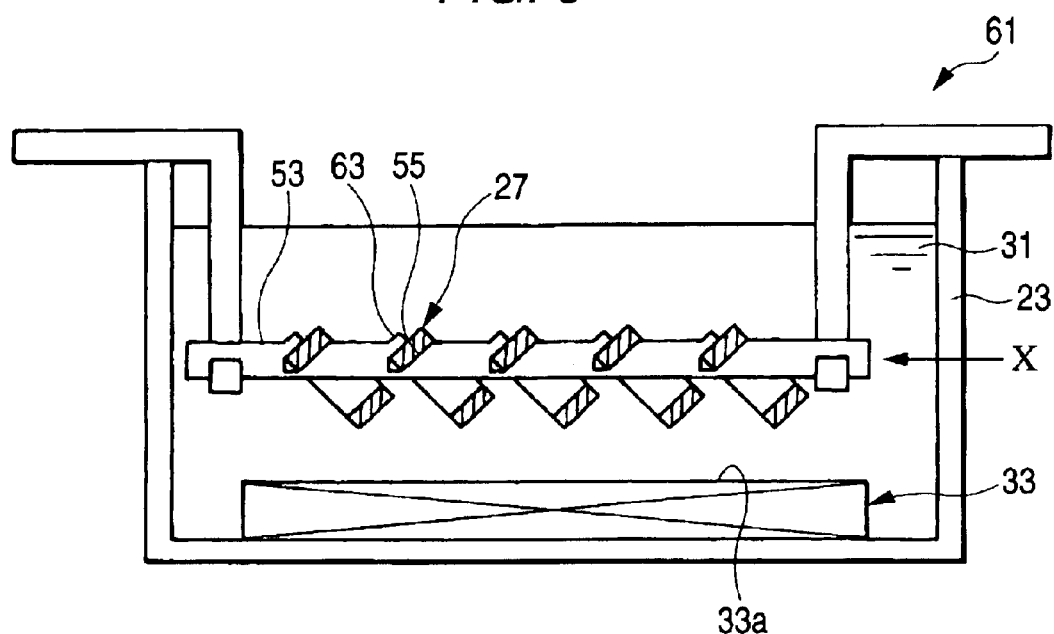
FIG. 9 is a longitudinal section view of a washing tank, explaining a washing jig according to a fourth embodiment of the invention.
Figure 10:
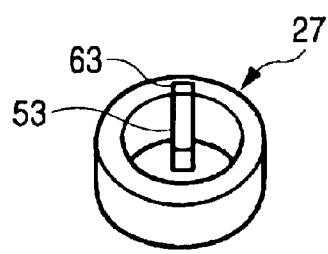
FIG. 10 is a schematic view of FIG. 9, when it is viewed from the direction of the arrow mark X shown in FIG. 9.
Figure 11:
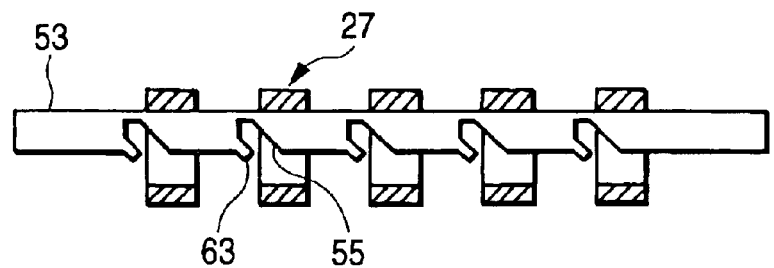
FIG. 11 is an explanatory view of the state of ring-shaped parts just before they are set.

FIG. 9 is a longitudinal section view of a washing tank, explaining a washing jig according to a fourth embodiment of the invention. FIG. 10 is a schematic view of FIG. 9, when it is viewed from the direction of the arrow mark X shown in FIG. 9. FIG. 11 is an explanatory view of the state of ring-shaped parts just before they are set.

A washing jig 61 according to the fourth embodiment has, as a basic structure thereof, a structure similar to that of the washing jig 51 discussed in the third embodiment and, in the notches 55 of the long plate 53 disposed in the washing jig 61, there are respectively disposed stoppers 63 which can be contacted with the upper portions of the outer peripheries of the ring-shaped parts 27 to thereby be able to stabilize the inclined support of the ring-shaped parts 27.

In the present washing jig 61, the long plate 53 is inserted into the inner peripheries of the ring-shaped parts 27, the upper portions of the inner peripheries of the ring-shaped parts 27 are respectively put into their associated notches 55 formed in the upper edge of the long plate 53, and the ring-shaped parts 27 can be disposed inclinedly with respect to the ultrasonic vibration plate 33 while the positions of the ring-shaped parts 27 are restricted by the notches 55. Also, according to the washing jig 61, as shown in FIG. 11, after the long plate 53 is inserted into the inner peripheral sides of the plurality of ring-shaped parts 27, by rotating the long plate 53 by 180°, the upper portions of the inner peripheries of the ring-shaped parts 27 can be put into the notches 55, whereby all of the ring-shaped parts 27 can be inclinedly supported on the long plate 53 at the same time. Further, in case where the upper portions of the inner peripheries of the ring-shaped parts 27 are put into the notches 55 of the long plate 53, the ring-shaped parts 27 are respectively supported in an inclined manner and, after then, the stoppers 63 are contacted with the upper portions of the outer peripheries of the thus inclinedly supported ring-shaped parts 27. That is, the stoppers 63 can prevent the ring-shaped parts 27 from moving out of the inclinedly supported state, which makes it possible to stabilize the inclined support of the ring-shaped parts 27.

Next, description will be given below of a washing jig according to a fifth embodiment of the invention.

Figure 12:
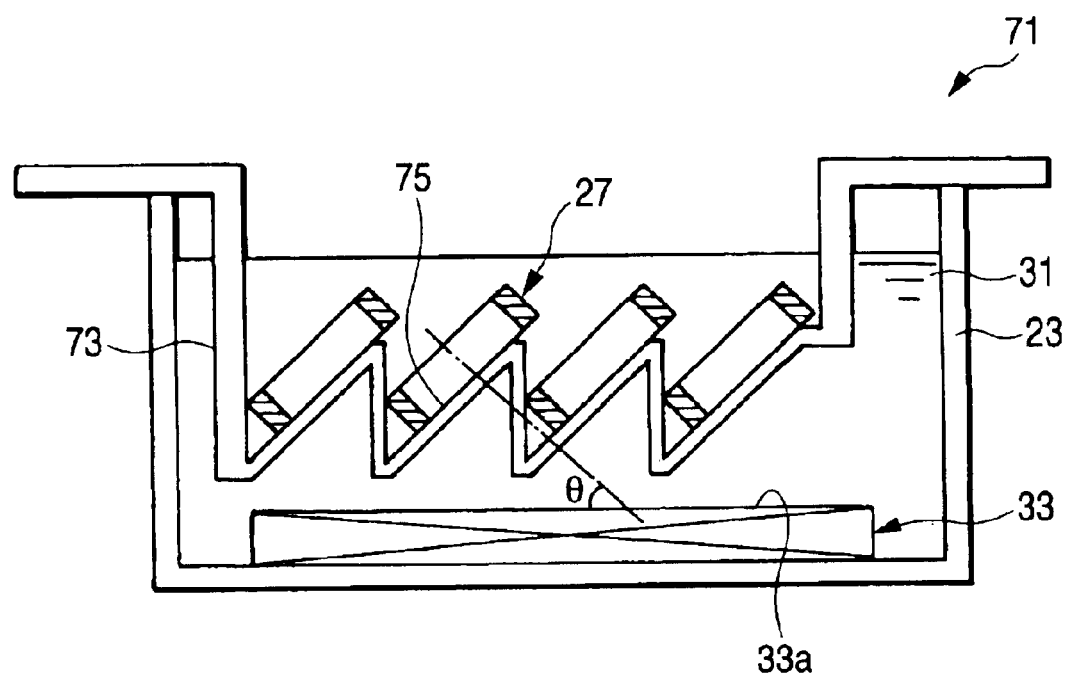
FIG. 12 is a longitudinal section view of a washing tank, explaining a washing jig according to a fifth embodiment of the invention.

FIG. 12 is a longitudinal section view of a washing tank, explaining a washing jig according to the fifth embodiment of the invention.

The washing jig 71 according to the fifth embodiment has a basket 73 formed of mesh or punching material for storing the ring-shaped parts 27 therein and, in the bottom portion of the basket 73, there are formed a plurality of saw-blade-shaped recessed portions 75 into which the lower portions of the ring-shaped parts 27 can be placed so that the ring-shaped parts 27 can be supported in an inclined manner.

According to the present washing jig 71, the lower portions of the ring-shaped parts 27 dropped down into the basket 73 are dropped down into the recessed portions 75 formed in the bottom portion of the basket 73 and thus, while the positions of the ring-shaped parts 27 are restricted by the recessed portions 75 respectively, the ring-shaped parts 27 can be disposed inclinedly with respect to the ultrasonic vibration plate 33. In this case, since the washing jig 71 does not use a part which is inserted into the inner peripheries of the ring-shaped parts 27, there is eliminated the operation to insert and remove the round rod 43 or long plate 53, which makes it possible to store or take out the plurality of ring-shaped parts 27 at a time. Also, since the basket 73 is formed of mesh or punching material, there is less possibility that the propagation of the ultrasonic waves can be interfered as well as there is less possibility that the ultrasonic waves cannot be propagated to the washing surfaces of the ring-shaped parts 27. In addition, the occurrence of the dead grounds on the washing surfaces of the ring-shaped parts 27, can be reduced.

By the way, according to a ring-shaped part washing method and a washing jig used in the same method according to the invention, the ring-shaped parts 27 are inclined in such a manner that the axes 27a thereof intersect the plate surface 33a of the ultrasonic vibration plate 33 at an angle θ other than a right angle. Specifically, the angle θ may be set in the range of 30°–60°.

Figure 13A:
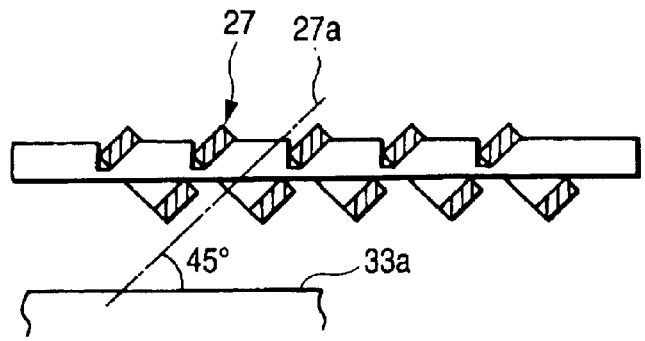
FIGS. 13A to 13C are respectively explanatory views of specific examples of the inclination angle of a ring-shaped part.

In this case, as shown in FIG. 13A, in case where the ring-shaped parts 27 are inclinedly disposed in such a manner that the axes 27a thereof intersect with the plate surface 33a of the ultrasonic vibration plate 33 at an angle of 45°, the average washing quantity can be secured without having the dead grounds, which are areas where ultrasonic waves cannot be applied, on the inner peripheral surfaces of the ring-shaped parts 27 as well as without increasing the distance between the ring-shaped parts 27.

Figure 13B:
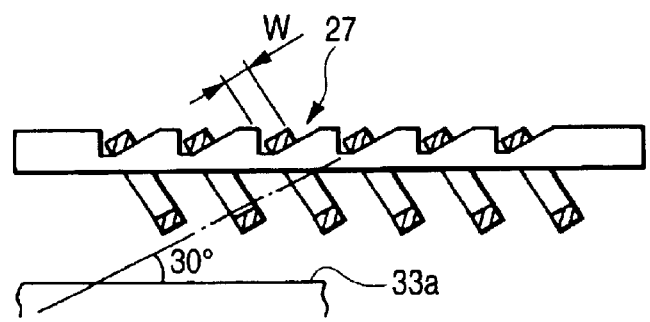

Also, as shown in FIG. 13B, when ring-shaped parts 27 each having a narrow width W in the axial direction thereof are used, in case where the ring-shaped parts 27 are inclinedly disposed in such a manner that the axes 27a thereof intersect with the plate surface 33a of the ultrasonic vibration plate 33 at an angle of 30°, the washing quantity can be increased while securing the propagation of the ultrasonic waves at the inner peripheral surfaces of the ring-shaped parts 27.

Figure 13C:
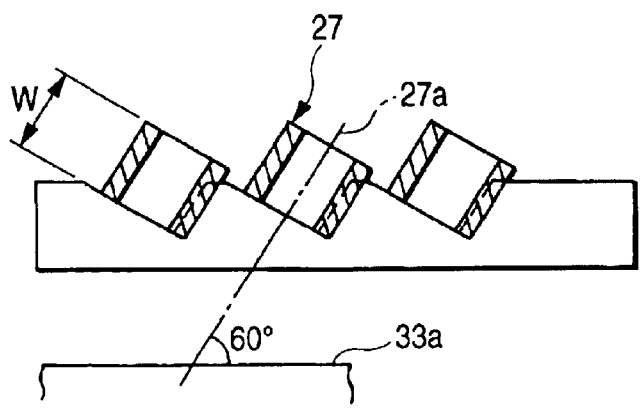
Figure 14:
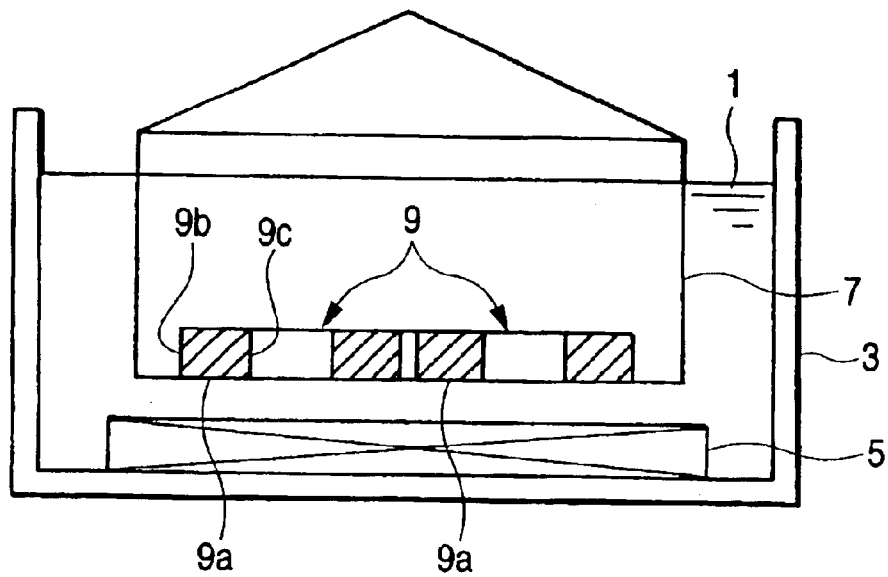
FIG. 14 is a longitudinal section view of a washing tank, explaining a conventional washing method using a basket; and, FIG. 15 is a longitudinal section view of a washing tank, explaining another conventional washing method using a skewer-shaped member.
Figure 15:
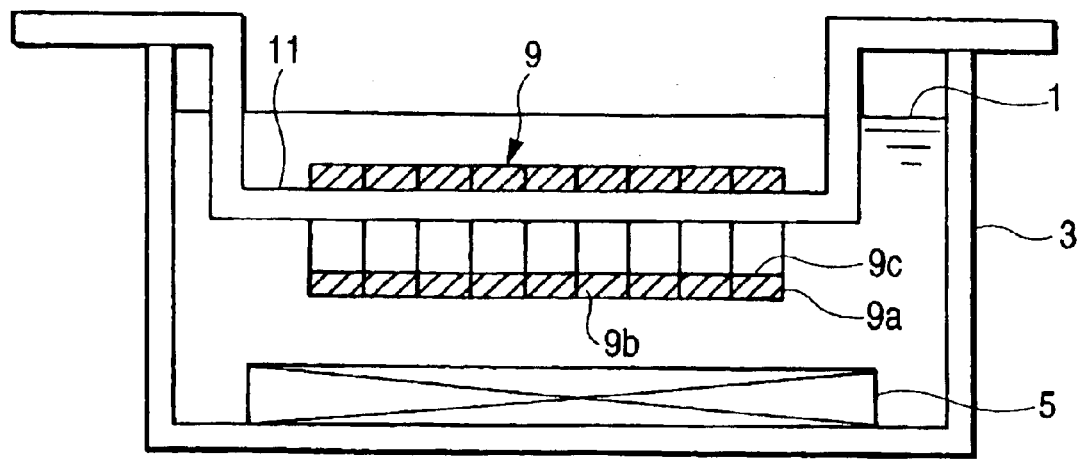

Further, as shown in FIG. 13C, in case where the ring-shaped parts 27 are inclinedly disposed in such a manner that the axes 27a thereof intersect with the plate surface 33a of the ultrasonic vibration plate 33 at an angle of 60°, even in the case of ring-shaped parts 27 each having a wide width W in the axial direction thereof as well, the effect of the ultrasonic waves at the inner peripheral surfaces of the ring-shaped parts 27 can be positively secured.

Moreover, the washing jig according to the invention may be structured in such a manner that a part of the ring-shaped parts 27 are inclined with the axes 27a thereof intersecting the plate surface 33a of the ultrasonic vibration plate 33 at the angle θ in the range of 30°–60° and the other ring-shaped parts 27 are inclined with the axes 27a thereof intersecting the plate surface 33a at the angle θ in the range of 120°–150°.

While only certain embodiments of the invention have been specifically described herein, it will apparent that numerous modifications may be made thereto without departing from the concept and scope of the invention.

As has been described in detail heretofore, according to a ring-shaped part washing method of the invention, the ring-shaped parts are inclinedly disposed such that the axes thereof intersect with the plate surface of the ultrasonic vibration plate at an angle other than a right angle. Thus, the inner peripheral surfaces and outer peripheral surfaces of the ring-shaped parts extending in parallel to the axes of the ring-shaped parts as well as the two end faces of the ring-shaped parts intersecting with the axes of the ring-shaped parts at right angles can be all disposed at given inclination angles with respect to the ultrasonic waves applied from the ultrasonic vibration plate. In addition, the ultrasonic waves applied directly from the ultrasonic vibration plate or reflected from the liquid surface can be positively applied onto the inner peripheral surfaces of the ring-shaped parts thereby preventing from having the dead grounds, which are areas where ultrasonic waves cannot be applied, on the inner peripheral surfaces of the ring-shaped parts. As a result of this, the ultrasonic waves can be applied equally onto all of the outer surfaces of the ring-shaped parts, thereby being able to obtain a high washing effect.

What is claimed is:

1. A ring-shaped part washing method, comprising the steps of:
    disposing ring-shaped parts in a washing tank filled with a washing fluid, each of said ring-shaped parts including a central axis and a ring face extending around the central axis, said ring-shaped parts being disposed inclinedly with respect to a ultrasonic vibration plate disposed in said washing tank in such a manner that the central axes of said ring-shaped parts intersect with a plate surface of said ultrasonic vibration plate at an angle other than a right angle, wherein said angle is set to be 30–60°; and
    applying ultrasonic waves, generated by said ultrasonic vibration plate, to thereby remove from said ring-shaped parts foreign substances adhering thereto.

2. The ring-shaped part washing method according to claim 1, wherein the ring-shaped parts are inner races or outer races of rolling bearings.

3. The ring-shaped part washing method according to claim 1, wherein there is provided a pair of parallel long plates having upper edges and two ends supported on the washing tank in such a manner that the longitudinal direction of the long plates defines a horizontal direction and plate surfaces of the long plates define vertical surfaces, and a plurality of notches is formed in the upper edges, wherein the lower portions of the ring-shaped parts can be put into the notches to support the ring-shaped parts in an inclined manner, at given intervals in the longitudinal direction of the long plates.

4. The ring-shaped part washing method according to claim 1, wherein there is provided a long plate having an upper edge and two ends supported on the washing tank in such a manner that the longitudinal direction of the long plate defines a horizontal direction and plate surfaces of the long plate define vertical surfaces, and a plurality of notches is formed in the upper edge, wherein the upper portions of the inner peripheries of the ring-shaped parts can be put into the notches to support the ring-shaped parts in an inclined manner, at given intervals in the longitudinal direction of the long plate.

5. The ring-shaped part washing method according to claim 1, wherein there is formed a basket made of mesh or punching material for storing the ring-shaped parts therein and, in the bottom portion of the basket, there are formed a plurality of saw-blade-shaped recessed portions into which the lower portions of the ring-shaped parts can be put to thereby support the ring-shaped parts in their inclined states.

6. A ring-shaped part washing method, comprising the steps of:
    disposing ring-shaped parts in a washing tank filled with a washing fluid, each of said ring-shaped parts including a central axis and a ring face extending around the central axis, said ring-shaped parts being disposed inclinedly with respect to a ultrasonic vibration plate disposed in said washing tank in such a manner that the central axes of said ring-shaped parts intersect with a plate surface of said ultrasonic vibration plate at an angle other than a right angle, wherein said angle is set to be in the range of 30–60° for some of the ring-shaped parts, and in the range of 120–150° for other ones of the ring-shaped parts; and
    applying ultrasonic waves, generated by said ultrasonic vibration plate, to thereby remove from said ring-shaped parts foreign substances adhering thereto.

7. A ring-shaped part washing method, comprising the steps of:
    disposing ring-shaped parts in a washing tank filled with a washing fluid, each of said ring-shaped parts including a central axis and a ring face extending around the central axis, said ring-shaped parts being disposed inclinedly with respect to a ultrasonic vibration plate disposed in said washing tank in such a manner that the central axes of said ring-shaped parts intersect with a plate surface of said ultrasonic vibration plate at an angle other than a right angle;
    applying ultrasonic waves, generated by said ultrasonic vibration plate, to thereby remove from said ring-shaped parts foreign substances adhering thereto;
    inserting a linear support member having a plurality of notches for inclinedly supporting said ring-shaped parts into inner peripheries of said ring-shaped parts while facing said notches downward, to thereby hang down said ring-shaped parts from said support member; and
    rotating said support member by 180° to face said notches upward, whereby upper portions of the inner peripheries of said ring-shaped parts are put into said notches so that all of said ring-shaped parts are inclinedly supported on said support member at the same time.

* * * * *